(12) United States Patent
Capolunghi et al.

(10) Patent No.: US 7,565,000 B2
(45) Date of Patent: Jul. 21, 2009

(54) METHOD AND APPARATUS FOR SEMI-AUTOMATIC SEGMENTATION TECHNIQUE FOR LOW-CONTRAST TUBULAR SHAPED OBJECTS

(75) Inventors: Renaud Capolunghi, Vanves (FR); Laurent Launay, Saint Rémy lès Chevreuse (FR); Jerome Knoplioch, Neuilly sur Seine (FR); Pál Csongor Sprencz, Vig utca (HU)

(73) Assignee: General Electric Company, Schenectady, NY (US)

( * ) Notice: Subject to any disclaimer, the term of this patent is extended or adjusted under 35 U.S.C. 154(b) by 692 days.

(21) Appl. No.: 11/286,550

(22) Filed: Nov. 23, 2005

(65) Prior Publication Data
US 2007/0116335 A1    May 24, 2007

(51) Int. Cl.
*G06K 9/00* (2006.01)
*G06K 9/34* (2006.01)

(52) U.S. Cl. .................. 382/128; 382/154; 382/173

(58) Field of Classification Search .......... 382/128, 382/129, 130, 131, 132, 133, 134, 154, 164, 382/171, 173, 179, 274; 600/407, 410, 417, 600/425, 429, 443, 449, 587; 128/916, 920; 601/119, 121, 122; 602/63, 901
See application file for complete search history.

(56) References Cited

U.S. PATENT DOCUMENTS

| 5,926,568 | A  | * | 7/1999  | Chaney et al. ............... 382/217 |
| 6,778,690 | B1 | * | 8/2004  | Ladak et al. ................. 382/131 |
| 7,149,333 | B2 | * | 12/2006 | Pieper et al. ................. 382/128 |
| 7,158,692 | B2 | * | 1/2007  | Chalana et al. ............. 382/294 |
| 7,236,618 | B1 | * | 6/2007  | Chui et al. ................... 382/128 |
| 2006/0098010 | A1 | * | 5/2006  | Dwyer et al. ............... 345/424 |

* cited by examiner

*Primary Examiner*—Abolfazl Tabatabai
(74) *Attorney, Agent, or Firm*—McAndrews, Held & Malloy, Ltd.; Peter J. Vogel; Michael A. Dellapenna

(57) ABSTRACT

A system and method for segmenting and editing anatomical objects from medical images is disclosed. The system may be a medical diagnostic imaging system. A computer unit may execute computer software for segmenting anatomical objects from medical images. The computer software may extract an anatomical object from planar curves. The computer software may extract an anatomical object by computing the centerline of the anatomical object. A set of reformatted images may then be derived based on the centerline of the object. A user may then provide input in the form of user drawn contours on a plurality of reformatted images. In an embodiment the reformatted images may include a reformatted longitudinal view, a curved reformatted view, or a lumen view. The user drawn contours may correspond to the boundaries of the anatomical object to be segmented. The anatomical object may then be extracted based on the user drawn contours.

23 Claims, 4 Drawing Sheets

400

METHOD AND APPARATUS FOR SEMI-AUTOMATIC SEGMENTATION TECHNIQUE FOR LOW-CONTRAST TUBULAR SHAPED OBJECTS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to a system and method for improved medical imaging. Particularly, the present invention relates to a more efficient system and method for segmenting anatomical objects and correcting the segmentation of anatomical objects.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. For instance, internal defects in an object may be detected. Additionally, changes in internal structure or alignment may be determined. Fluid flow within an object may also be represented. Furthermore, the image may show the presence or absence of objects in an object. The information gained from medical diagnostic imaging has applications in many fields, including medicine and manufacturing.

One application of utilizing the information gained from medical diagnostic imaging systems in the field of medicine is the segmentation of anatomical objects. The segmentation of anatomical objects and/or structures from two and three-dimensional images is important to allow the analysis of those anatomical objects and/or structures. For example, a particular organ or tissue may be extracted from the surrounding organs or tissues. The extracted organ or tissue may then be viewed independent of other objects that are not of interest. Such extraction allows a physician to focus only on the objects or structures of interest and develop a more accurate diagnosis and treatment strategy.

Anatomical segmentation, however, is a complex problem. Manual segmentation is a tedious, time consuming process that often yields inaccurate results. Fully automatic segmentation, although ideal, currently does not yield acceptable results. A combination of manual segmentation and automatic segmentation has yielded a number of interactive segmentation techniques.

Currently, a "live wire" technique allows a user to select a seed point on a contour, and while dragging and moving the mouse, the optimal line between the seed point and the current position may be computed. The live wire algorithm, however, may only be used in the two dimensional space and hence, this technique is a slice-by-slice segmentation, where the drawn contour on one slice becomes the initial contour on the next slice and this initial contour can be deformed.

Another strategy models edges in a surface mesh as semi-elastic linked elements in a chain. The surface mesh vertices connect the edges, so when a vertex is edited, the displacement stretches or compresses its neighboring edges. The difficulty in this strategy is to define the required extent of displacement. Another strategy that may be used is to use some medical information about the to-be-segmented object. The information may be a model, a map that can be verified to the actual medical images and then modified by the user. Since some medical objects may assume several forms, it is very hard to choose the correct model for the actual medial images or the degree of deformation allowable.

These, and other current techniques have been insufficient in the extraction of low-contrast objects. Accordingly, a system and method is needed for easier segmentation of anatomical objects. Specifically, a need exists for a segmentation technique to achieve low-contrast objects. Such a system and method may allow a user to be more efficient and effective in diagnosing and treating medical conditions.

SUMMARY OF THE INVENTION

Certain embodiments of the present invention may include a method for segmenting anatomical objects from medical images. The method may include computing a centerline of an anatomical object. The method may also include deriving a set of reformatted images based on the centerline of the anatomical object. Input may be received by a user. The input may be user drawn contours. The user drawn contours may be drawn on a plurality of reformatted images. The reformatted images may include a cross-section view orthogonal to the centerline and a longitudinal view tangent to the centerline. The reformatted images may also include an axial view, a sagittal view, or a coronal view. The reformatted images may also include a reformatted longitudinal view, a curved reformatted view, and/or a lumen view. The user drawn contours may correspond to the boundaries of the anatomical object to be segmented.

Next, the method may include extracting the anatomical objected based on the user drawn contours. The extraction of the anatomical object may also be based on utilizing previously computed segmentation results and/or previous knowledge of the anatomy of a patient. The contours of the extracted volume may then be displayed. In the embodiment where the anatomical object is a thrombus, the contours are displayed on cross-sectional reformatted slices. The reformatted slices are locally perpendicular to the centerline of the aorta lumen.

The contours of the extracted volume may then be edited. In an embodiment, the step of editing the contours of the extracted volume includes manual editing by a user. Manually editing the contours of the extracted volume may include drawing a new contour and detecting the portion of the current contour to be replaced by projecting end points of the new contour to the closest location on the current contour. Additionally, editing the contours of the extracted volume may include applying a three-dimensional interpolation and computing a new volume for display. Furthermore, the step of editing the contours of the extracted volume includes pulling the current volume contour to the accurate location and applying a two-dimensional interpolation to the contour.

Certain embodiments of the present invention include a medical diagnostic imaging system. The medical diagnostic imaging system may include a computer unit for manipulating data. The computer unit executes computer software for segmenting anatomical objects from medical images. The computer software computes a centerline of an anatomical object. The computer software derives a set of reformatted images based on the centerline of the anatomical object and extracts the anatomical object based on the user drawn contours. The extraction of the anatomical object may also be based on utilizing previously computed segmentation results and/or previous knowledge of the anatomy of a patient.

The medical diagnostic imaging system may also include an input unit for receiving input from a user. The input unit may receive input from a user. The input may be user drawn contours. The input may also be input for manually editing the contours of the extracted volume. The user drawn contours may be drawn on a plurality of reformatted images. The reformatted images may include a cross-section view orthogonal to the centerline and a longitudinal view tangent to the centerline. The reformatted images may also include an axial view, a sagittal view, or a coronal view. The reformatted images may also include a reformatted longitudinal view, a curved reformatted view, and/or a lumen view. The user drawn contours may correspond to the boundaries of the anatomical object to be segmented.

The medical diagnostic imaging system may also include a display unit for displaying contours of the extracted volume. In the embodiment where the anatomical object is a thrombus, the contours are displayed on cross-sectional reformatted slices. The reformatted slices are locally perpendicular to the centerline of the aorta lumen.

The system and method described above may be carried out as part of a computer-readable storage medium including a set of instructions on a computer. The set of instructions may include a computation routine for computing a centerline of an anatomical object. The set of instructions may include a derivation routine for deriving a set of reformatted images based on the centerline of the object. The set of instructions may also include a receipt routine for receiving input from a user. The input may be user drawn contours. The user drawn contours may be drawn on a plurality of the reformatted images. The user drawn contours may correspond to the boundaries of the anatomical object to be segmented. The set of instructions may also include an extraction routine for extracting the anatomical object based on user drawn contours and displaying contours of the extracted volume. The set of instructions may also include an editing routine for editing the contours of the extracted volume.

DETAILED DESCRIPTION OF THE INVENTION

Figure 1:
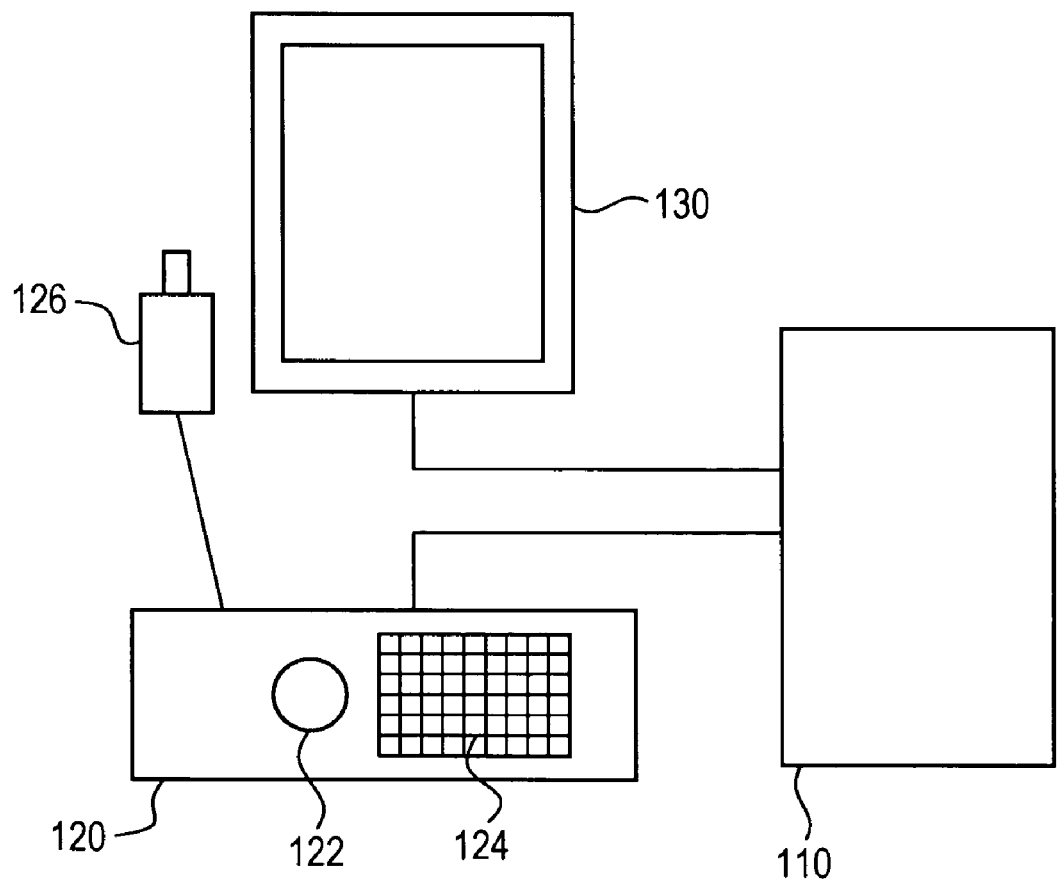
FIG. 1 illustrates an example of a system that may be used in accordance with an embodiment of the present invention.

FIG. 1 illustrates a system 100 for controlling the display and segmentation of medical images. The system 100 includes a computer unit 110. The computer unit 110 may be any equipment or software that permits electronic medical images, such as x-rays, ultrasound, CT, MRI, EBT, MR, or nuclear medicine for example, to be electronically acquired, stored, or transmitted for viewing and operation. The computer unit 110 may be connected to other devices as part of an electronic network.

The system 100 also includes an input unit 120. The input unit 120 may be a console having a track ball 122 and keyboard 124. The input unit 120 may also have a tracing pen 126. Other input devices may be used to receive input from a user as part of the input unit 120. For example a microphone may be used to receive verbal input from a user. The tracing pen 126 may communicate with the input unit 120 through a wire. The tracing pen 126 may also communicate with the input unit 120 in a wireless fashion.

The system 100 also includes at least one display unit 130. The display unit 130 may be a typical computer display unit. The display unit 130 may be in electrical communication with the computer unit 110 and input unit 120. The display unit 130 may have the capability of transmitting touch screen input from the tracing pen 126 to either the input unit 120 or the computer unit 110. For example, a user may use the tracing pen 126 to trace a curve on an image displayed on the display unit 130. The location of the curve may then be transmitted to the computer unit 110 for processing.

In an embodiment, the display unit 130 may represent multiple display units or display regions of a screen. Accordingly, any number of display units may be utilized in accordance with the present invention. Additionally, the computer unit 110, input unit 120, and display unit 130 may be separate units or be part of a single unit. Accordingly, the components of the system 100 may be single units, separate units, may be integrated in various forms, and may be implemented in hardware and/or in software.

In operation, the system 100 may be a medical diagnostic imaging system. The medical diagnostic imaging system may include a computer unit 110. The computer unit 110 may be used for manipulating data. The computer unit 110 may be used for executing computer software for segmenting anatomical objects from medical images. The computer software may receive input from a user or other source, such as a computer database, compute a centerline of an anatomical object, derive a set of reformatted images based on the centerline of the anatomical object, and extract the anatomical object based on the user drawn contours.

The input unit 120 may receive input from a user. The input from a user may be user drawn contours. The user drawn contours may be drawn on a plurality of the reformatted images. The reformatted images may include a cross-section view orthogonal to the centerline and a longitudinal view tangent to the centerline. The reformatted images may also include a curved reformatted view, a reformatted longitudinal view, and/or a lumen view. The user drawn contours may correspond to the boundaries of the anatomical object to be segmented. The display unit 130 may display contours of the extracted volume.

Figure 2:
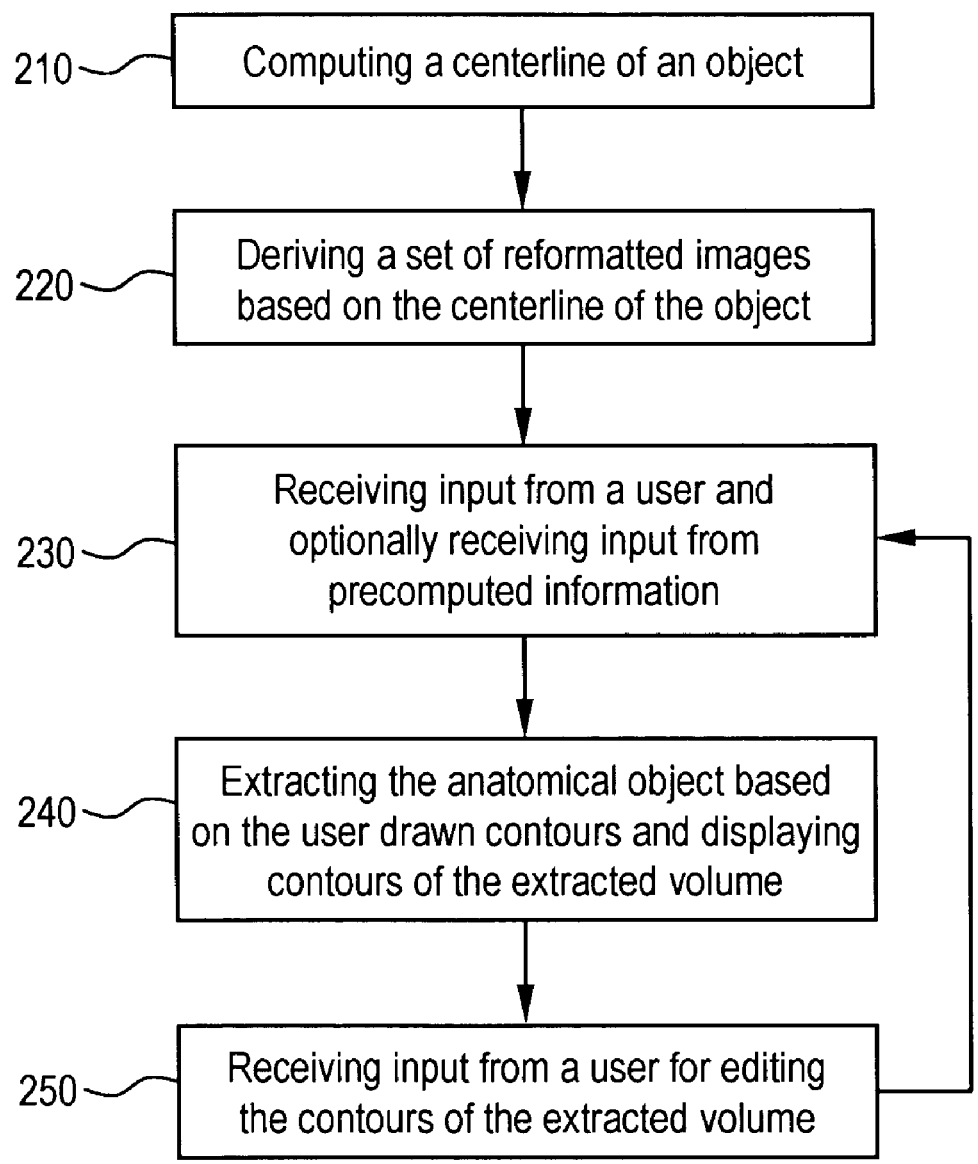
FIG. 2 illustrates a method 200 for segmenting anatomical objects from medical images that may be used in accordance with an embodiment of the present invention.

FIG. 2 illustrates a method 200 for segmenting anatomical objects from medical images. At step 210, computation of the centerline of an object may be computed. Computation of the centerline may be achieved based on one or several points specified by the user. For example, computation of the centerline may be based on the computation of the three-dimensional path that minimizes a cost function. The cost function may be built so that a path along which the variation of the density is small will have a low cost. An additional factor may be recentering of the three-dimensional path based on rough segmentation of the vessel.

At step 220, a set of reformatted images are derived based on the centerline of the object. The reformatted images may include cross-section views that are orthogonal to the centerline and longitudinal views that are tangent to the centerline. More complex longitudinal views may be generated by "unfolding" the vessel in a plane. For example, curved reformat views unfold the vessel while preserving its curvature in two-dimensions. Lumen views may unfold the vessel as a straight line.

At step 230, the computer unit 110 receives input from a user. The input from a user may be in the form of contours of a structure from the longitudinal views. A user may outline the boundaries of an anatomical region to segment by drawing curved lines, using the tracing pen 126 for example, on a two-dimensional view. The two-dimensional views may consist of an axial, sagittal, or coronal views. The two-dimensional views may also be reformatted longitudinal oblique views or lumen views. The two-dimensional views may also be curved views, for example two-dimensional views reformatted along a three-dimensional line. Such a three-dimensional line may be the centerline of a vessel, for example.

In an embodiment of the invention, the user has the ability to draw several boundaries. The user can also edit or suppress the boundaries individually. The boundaries may be drawn on a single screen by displaying several orientations at the same time. In such an embodiment, the orientations may be linked. The purpose of the boundaries are to give control points to the extraction algorithm for extracting the anatomical region. The control points identify the boundaries that surround the region to be extracted and are a subset of the accurate limits of the region to be extracted. An optimal display layout comprises several views taken at different orientations around the structure. The computer unit 110 may also receive as input precomputed information based on exam data, such as precomputed segmentation results or prior knowledge of the anatomy, for example.

Figure 3:
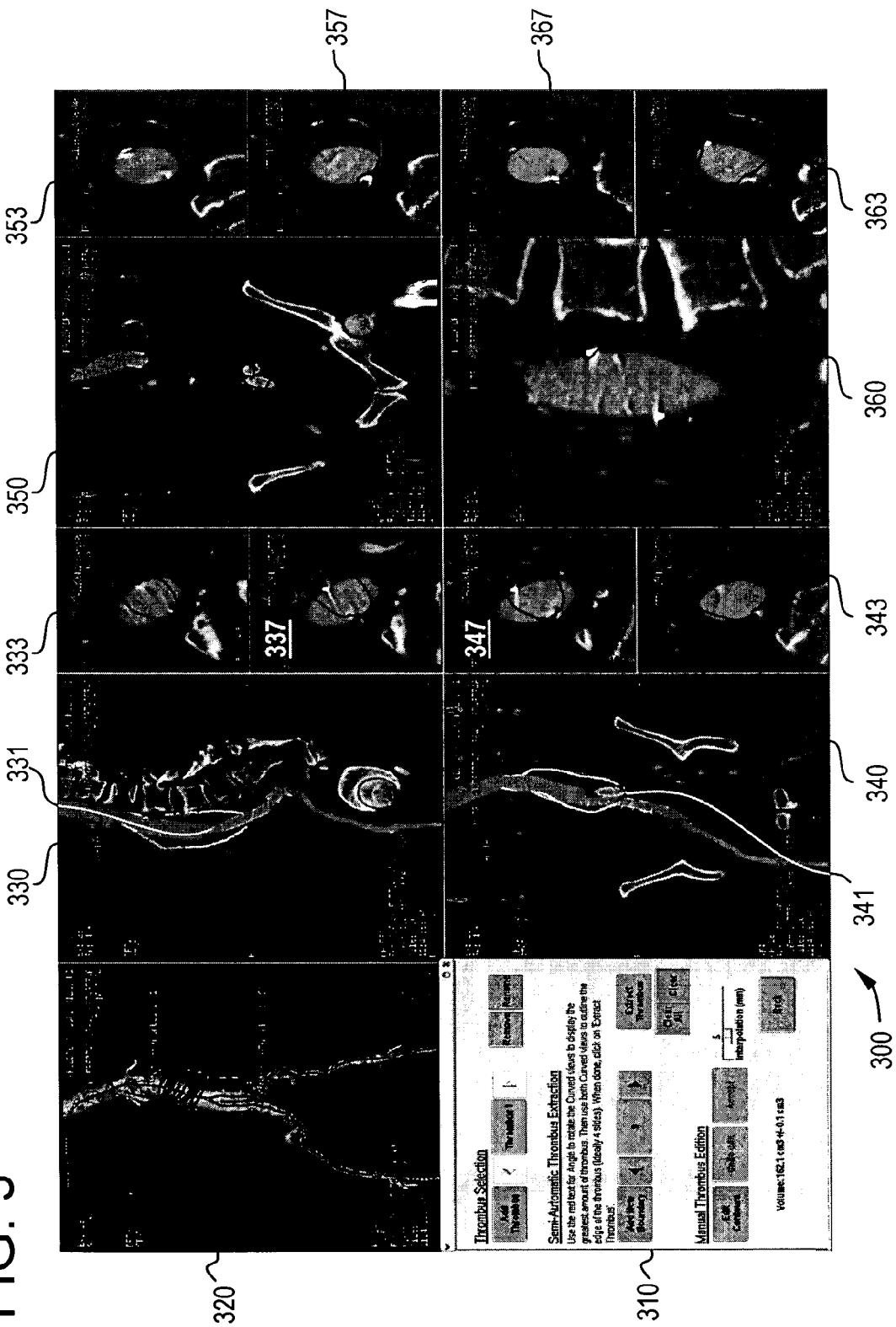
FIG. 3 illustrates a screen shot illustrating a user input screen on which a user may enter contours that may be used in accordance with an embodiment of the present invention.

As an example, FIG. 3 illustrates a screen shot 300 of a display that may be displayed on display unit 130 for performing a Thrombus extraction. The screen shot 300 illustrates the various two-dimensional views a user may utilize to draw on as user input for the extraction algorithm 330-367, a three-dimensional view 320 a user may draw on as input for the extraction algorithm, and a control window 310 for controlling user inputs and computer software.

For example, sections 330 and 340 represent two longitudinal curved reformat views computed at 90 degrees from each other. User drawn contours 331 and 341 respectively, are shown in sections 330 and 340. Sections 333, 337, 343, 347, 353, 357, 363, and 367, represent orthogonal cross-sectional views. The user drawn contours are shown in the orthogonal cross-section views as closed-loop outlines on top of the anatomical structures of the images. Section 350 illustrates a coronal view with the contours are illustrated as a closed-loop outline on top of the anatomical structures of the image. Section 360 illustrates an oblique view of the coronal view 350. The contours are illustrated as a closed-loop outline on top of the anatomical structures of the image. By illustrating multiple viewing angles, the user can check visually on the result of the segmentation by looking at the contours.

At step 240, the computer unit executes computer software and utilizes the user input and any other available input to extract the anatomical object based. In an embodiment, the extraction algorithm may carve out a volume that is surrounded by the boundaries as designated by the user. Additionally, the volume limits may include the boundaries as designed by the user. The extraction of the anatomical object may also be based on utilizing previously computed segmentation results and/or previous knowledge of the anatomy of a patient.

The extraction algorithm may use as input precomputed data based on Hounsfield Unit values as well as prior knowledge of the anatomy. In an embodiment, computer software processes the stack on orthogonal cross-sections and applies a two-dimensional segmentation algorithm. The user contours may intersect with each plane. The intersections provide a set of points. The algorithm may find the best contour that goes through this set of points. The algorithm may achieve the best contour by minimizing the cost of a path. In the example of the thrombus, the cost function is optimized to best find the path that matches the intensity of an aneurysm thrombus.

At step 250, a user may edit the boundaries of the extracted anatomical object. The user may manually edit the boundaries by directly drawing on the views using the tracing pen 126, for example. An automatic editing program may also be used. The user may drag the current volume contour and pull it to the accurate location. A two-dimensional interpolation may be applied locally so the smoothness of the contour is conserved. A user may also manually edit the boundaries by directly drawing the true contour. The computer software may then detect the part of the current contour to be replaced by projecting end points of the new contour to the closes location on the current contour. Once the user has edited a contour on a two-dimensional view, a three-dimensional interpolation may be applied so the changes are propagated to neighboring two-dimensional slices. A user may control the range of interpolation, for example the number of slices influenced by an edition, using a slider. After the three-dimensional interpolation is applied, the new volume may be computed and displayed, and associated characteristics updated.

Figure 4:
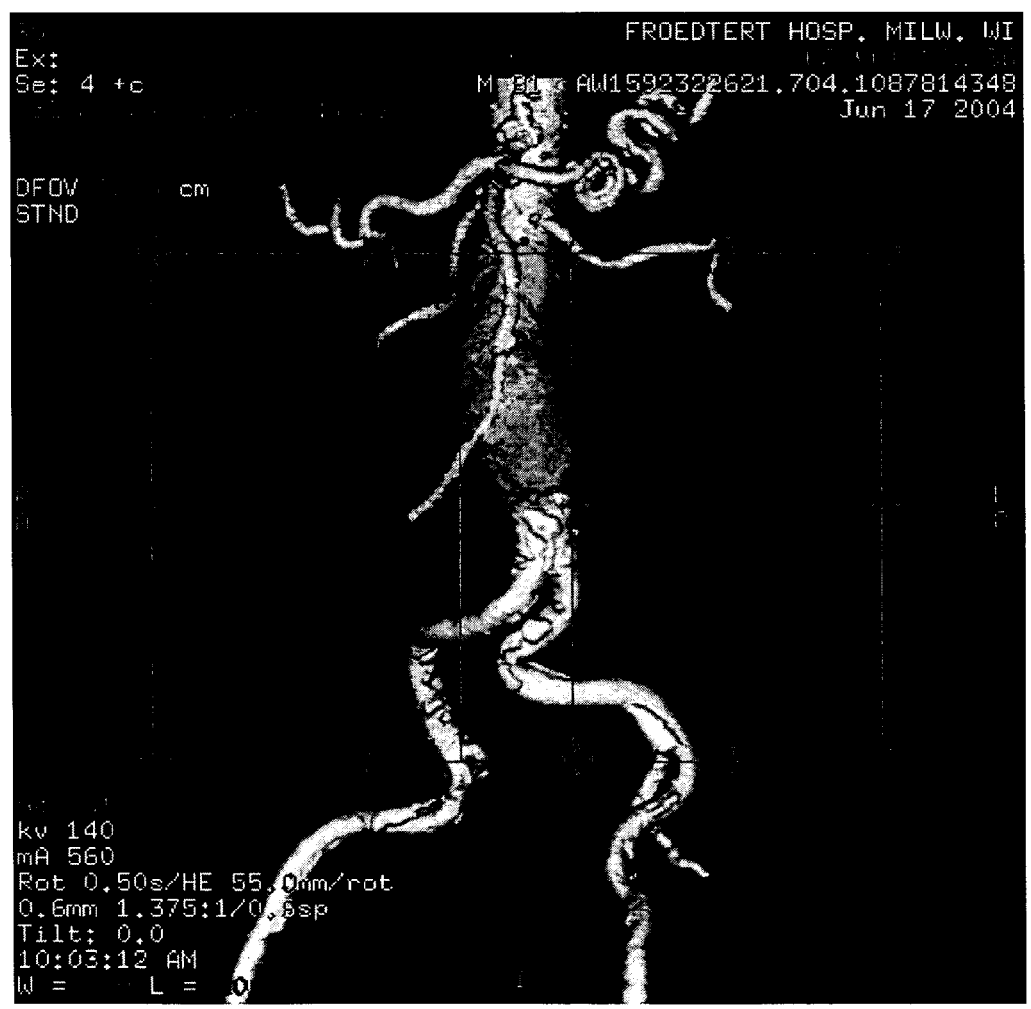
FIG. 4 illustrates a screen shot illustrating a screen shot of a display after a thrombus segmentation that may be used in accordance with an embodiment of the present invention.

As an example, FIG. 4 illustrates a screen shot 400 of display after semi automated thrombus segmentation. Such a display may be displayed on display unit 130. In operation, to extract the thrombus using the system 100 and method 200, a user first starts by computing the centerline of the aorta. In an embodiment, the precomputed data is the centerline of the aorta that will help in identifying a marker for the inside part of the thrombus. After the centerline is computed, reformatted images based on the centerline of the object may be derived.

A user may then draw contours to outline the boundaries of the thrombus. The user contours and precomputed data may then be used as input for the extraction algorithm. The extraction algorithm may provide the contours of the extracted volume. Contours of the extracted volume may be displayed as two-dimensional views on cross-sectional reformatted slices, locally perpendicular to the centerline of the aorta lumen as well as on all other reformatted baseline or oblique views. A three-dimensional volume rendering view may also be displayed as a segmented lumen of the aorta, with transparent extracted thrombus, and transparent bones for localization purpose. Similar rendering can be achieved for soft plaque. Characteristics of the extracted volume may be computed and displayed. For example, characteristics may include statistics or criteria on shape and density. If the user is satisfied with the extraction, the user may edit the extraction. In an embodiment, the user may manually edit the extraction. A user may manually edit the contours of the extracted volume by drawing the new contour. The computer software may detect the portion of the current contour to be replaced by projecting end points of the new contour to the closest location on the current contour. If the user is not satisfied, the user may draw new boundaries or modify existing ones and re-execute the extraction algorithm.

The system and method described above may be carried out as part of a computer-readable storage medium including a set of instructions for a computer. The set of instructions includes a computation routine for computing a centerline of an object. The set of instructions also includes a derivation routine for deriving a set of reformatted images based on the centerline of the object. The set of instructions may also include a receipt routine for receiving input from a user and optionally receiving input from precomputed information. The set of instructions may also include an extraction routine for extracting an anatomical object based on the user drawn contours and displaying contours of the extracted volume. The set of instructions may also include an editing routine for receiving input from a user for manually editing the contours of the extracted volume.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for segmenting anatomical objects from medical images, said method comprising using a computer to perform at least the following:

computing a centerline of an anatomical object;

deriving a set of reformatted images based on said centerline of said anatomical object;

receiving input from a user, said input being user drawn contours, said user drawn contours being drawn on a plurality of said reformatted images, said user drawn contours corresponding to the boundaries of the anatomical object to be segmented;

extracting said anatomical object based on said user drawn contours and displaying contours of the extracted volume; and, editing the contours of the extracted volume.

2. The method of claim 1, wherein the step of editing the contours of the extracted volume includes manual editing by a user.

3. The method of claim 2, wherein the step of manually editing the contours of the extracted volume includes drawing the new contour, and detecting the portion of the current contour to be replaced by projecting end points of the new contour to the closest location on the current contour.

4. The method of claim 1, wherein said reformatted images include a cross-section view orthogonal to the centerline and a longitudinal view tangent to the centerline.

5. The method of claim 1, wherein said set of reformatted images includes an axial view, a sagittal view, or a coronal view.

6. The method of claim 1, wherein said set of reformatted images includes a reformatted longitudinal view.

7. The method of claim 1, wherein said set of reformatted images includes a curved reformatted view.

8. The method of claim 1, wherein said set of reformatted images includes a lumen view.

9. The method of claim 1, wherein said step of extracting said anatomical object based on said user drawn contours further includes utilizing previously computed segmentation results.

10. The method of claim 1, wherein said step of extracting said anatomical object based on said user drawn contours further includes utilizing previous knowledge of the anatomy of a patient.

11. The method of claim 1, wherein said anatomical object is a thrombus, said contours are displayed on cross-sectional reformatted slices, said reformatted slices are locally perpendicular to the centerline of the aorta lumen.

12. The method of claim 1, wherein the step of editing the contours of the extracted volume includes pulling the current volume contour to the accurate location and applying a two-dimensional interpolation to said contour.

13. The method of claim 1, wherein the step of editing the contours of the extracted volume includes applying a three-dimensional interpolation and computing a new volume for display.

14. A medical diagnostic imaging system, said system comprising:

a computer unit for manipulating data, said computer unit executing computer software for segmenting anatomical objects from medical images, said computer software computing a centerline of an anatomical object, deriving a set of reformatted images based on said centerline of said anatomical object, extracting said anatomical object based on said user drawn contours;

an input unit for receiving input from a user, said input being user drawn contours, said user drawn contours being drawn on a plurality of said reformatted images, said user drawn contours corresponding to the boundaries of the anatomical object to be segmented;

a display unit for displaying contours of the extracted volume.

15. The system of claim 14, wherein said input unit receives input from a user, said input additionally being user input for manually editing the contours of the extracted volume.

16. The system of claim 14, wherein said reformatted images include a cross-section view orthogonal to the centerline and a longitudinal view tangent to the centerline.

17. The system of claim 14, wherein said set of reformatted images includes a curved reformatted view.

18. The system of claim 14, wherein said set of reformatted images includes a reformatted longitudinal view.

19. The system of claim 14, wherein said set of reformatted images includes a lumen view.

20. The system of claim 14, wherein extracting said anatomical object based on said user drawn contours further includes utilizing previously computed segmentation results.

21. The system of claim 14, wherein extracting said anatomical object based on said user drawn contours further includes utilizing previous knowledge of the anatomy of a patient.

22. The system of claim 14, wherein said anatomical object is a thrombus, said contours are displayed on cross-sectional reformatted slices, said reformatted slices are locally perpendicular to the centerline of the aorta lumen.

23. A computer-readable storage medium including a set of instructions for a computer, the set of instructions comprising:

a computation routine for computing a centerline of an anatomical object;

a derivation routine for deriving a set of reformatted images based on said centerline of said object;

a receipt routine for receiving input from a user, said input being user drawn contours, said user drawn contours being drawn on a plurality of said reformatted images, said user drawn contours corresponding to the boundaries of the anatomical object to be segmented;

an extraction routine for extracting said anatomical object based on user drawn contours and displaying contours of the extracted volume; and an editing routine for editing the contours of the extracted volume.

* * * * *